(12) United States Patent
Tuberquia et al.

(10) Patent No.: US 10,738,185 B2
(45) Date of Patent: Aug. 11, 2020

(54) COMPOSITION, INJECTION MOLDED ARTICLE MADE THEREFROM AND PROCESS TO MAKE AN INJECTION MOLDED ARTICLE

(71) Applicant: Dow Global Technologies LLC, Midland, MI (US)

(72) Inventors: Juan Tuberquia, Manvel, TX (US); Laura Weaver, Lake Jackson, TX (US); Santosh Bawiskar, Sugar Land, TX (US); Greg Li, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 675 days.

(21) Appl. No.: 15/323,379

(22) PCT Filed: Jun. 18, 2015

(86) PCT No.: PCT/US2015/036321
§ 371 (c)(1),
(2) Date: Dec. 30, 2016

(87) PCT Pub. No.: WO2016/003657
PCT Pub. Date: Jan. 7, 2016

(65) Prior Publication Data
US 2019/0284382 A1    Sep. 19, 2019

Related U.S. Application Data

(60) Provisional application No. 62/020,499, filed on Jul. 3, 2014.

(51) Int. Cl.
| | |
|---|---|
| *C08L 23/16* | (2006.01) |
| *B29C 45/00* | (2006.01) |
| *C08K 5/00* | (2006.01) |
| *C08K 5/01* | (2006.01) |
| *C08L 23/08* | (2006.01) |
| *C08L 23/14* | (2006.01) |
| *C08L 53/00* | (2006.01) |
| *C08L 23/10* | (2006.01) |
| *C08L 53/02* | (2006.01) |
| *B29K 23/00* | (2006.01) |
| *B29L 31/42* | (2006.01) |
| *B29L 31/50* | (2006.01) |

(52) U.S. Cl.
CPC .......... *C08L 23/16* (2013.01); *B29C 45/0001* (2013.01); *C08K 5/0016* (2013.01); *C08K 5/01* (2013.01); *C08L 23/0853* (2013.01); *C08L 23/10* (2013.01); *C08L 23/14* (2013.01); *C08L 53/00* (2013.01); *C08L 53/025* (2013.01); *B29K 2023/083* (2013.01); *B29K 2023/14* (2013.01); *B29K 2023/16* (2013.01); *B29K 2995/007* (2013.01); *B29K 2995/0031* (2013.01); *B29K 2995/0041* (2013.01); *B29K 2995/0063* (2013.01); *B29L 2031/425* (2013.01); *B29L 2031/50* (2013.01)

(58) Field of Classification Search
CPC ...... C08L 23/16; C08L 23/0853; C08L 23/14; C08L 53/00; B29C 45/0001; C08K 5/0016; C08K 5/01; B29K 2023/083; B29K 2023/14; B29K 2023/16; B29K 2995/0031; B29K 2995/0041; B29K 2995/0063; B29K 2995/007; B29L 2031/425; B29L 2031/50
See application file for complete search history.

(56) References Cited

U.S. PATENT DOCUMENTS

| | | | |
|---|---|---|---|
| 5,483,002 A | 1/1996 | Seelert et al. | |
| 5,504,172 A | 4/1996 | Imuta et al. | |
| 6,525,157 B2 | 2/2003 | Cozewith et al. | |
| 6,960,635 B2 | 11/2005 | Stevens et al. | |
| 8,420,760 B2 | 4/2013 | Hughes et al. | |
| 2006/0211819 A1 | 9/2006 | Hoenig et al. | |
| 2006/0247331 A1* | 11/2006 | Coffey et al. ............... | C08J 3/18 523/351 |
| 2007/0251572 A1 | 11/2007 | Hoya et al. | |
| 2010/0285253 A1* | 11/2010 | Hughes et al. ......... | C08F 10/00 428/36.9 |
| 2013/0011596 A1 | 1/2013 | Hoya et al. | |
| 2013/0011649 A1 | 1/2013 | Hoya et al. | |
| 2013/0017351 A1 | 1/2013 | Hoya et al. | |

(Continued)

FOREIGN PATENT DOCUMENTS

WO         00/01745 A1     1/2000

*Primary Examiner* — Nathan M Nutter
(74) *Attorney, Agent, or Firm* — Quarles & Brady LLP (57) ABSTRACT

A composition including (a) propylene/ethylene interpolymer having a density from 0.860 to 0.870 g/cc; (b) a propylene-based polymer selected from the group consisting of a homopolymer polypropylene, a random propylene/α-olefin interpolymer and any combination thereof and wherein the propylene-based polymer has a density ≥0.885 g/cc; (c) a plasticizing agent; and (d) a third polymer selected from the group consisting of the following (i) a styrenic ethylene/butylene triblock copolymer having a Tg (rubber block) greater than, or equal, −40° C., (ii) less than, or equal to, 15 wt %, based on the weight of the composition, of an ethylene/α-olefin/diene interpolymer, or an ethylene/propylene copolymer, (iii) an ethylene vinyl acetate copolymer, and (iv) any combination thereof is provided. Further provided is an injection molded article comprising the composition and a process for making an injection molded article.

18 Claims, 1 Drawing Sheet

(56) References Cited

U.S. PATENT DOCUMENTS

| | | |
|---|---|---|
| 2013/0017379 A1 | 1/2013 | Hoya et al. |
| 2014/0364572 A1 | 12/2014 | Weaver et al. |
| 2015/0353718 A1 | 12/2015 | Weaver et al. |

* cited by examiner

COMPOSITION, INJECTION MOLDED ARTICLE MADE THEREFROM AND PROCESS TO MAKE AN INJECTION MOLDED ARTICLE

FIELD OF INVENTION

The instant invention relates to a composition, injection molded article made therefrom and process to make an injection molded article.

BACKGROUND OF THE INVENTION

Clear flexible PVC is used in a number of products wherein the end user and manufacturer prefer lighter weight, phthalate-free polymeric options. One such product is footwear, and specifically boots.

Such products are typically injection molded thereby requiring modulus control and temperature resistance, low tackiness and at least 85° C. DSC re-crystallization temperature (Tc). It would be additionally useful to have a Shore A hardness less than 65 while not negatively impacting the flow properties, clarity, or Tc.

SUMMARY OF THE INVENTION

The instant invention is a composition, injection molded article made therefrom and process to make an injection molded article.

In one embodiment, the instant invention provides a composition comprising (a) propylene/ethylene interpolymer having a density from 0.860 to 0.870 g/cc; (h) a propylene-based polymer selected from the group consisting of a homopolymer polypropylene, a random propylene/α-olefin, and combinations thereof and wherein the propylene-based polymer has a density greater than or equal to 0.885 g/cc; (c) a plasticizing agent; and (d) a third polymer selected from the group consisting of (i) a styrenic ethylene/butylene triblock copolymer having a Tg (rubber block) greater than, or equal, −40° C., (ii) less than, or equal to, 15 wt % based on the weight of the composition, of an ethylene/α-olefin/diene interpolymer, (iii) an ethylene vinyl acetate copolymer, and (iv) any combination thereof.

DETAILED DESCRIPTION OF THE INVENTION

Figure 1:
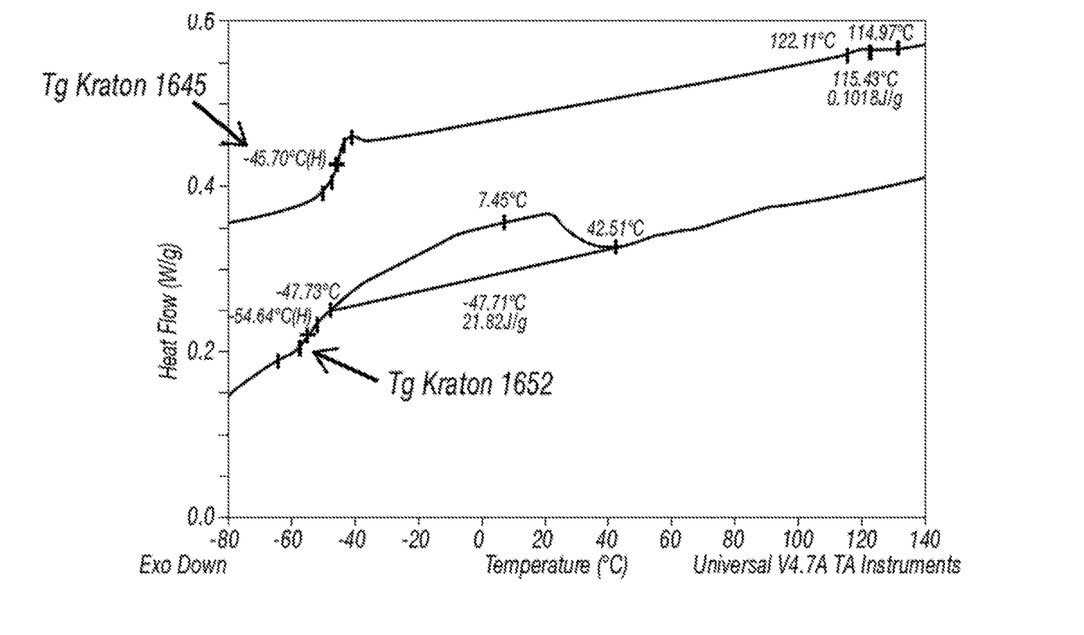
The FIGURE is a graph illustrating the DSC curves and Tg of two KRATON polymers.

The instant invention is a composition, injection molded article made therefrom and process to make an injection molded article.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin The term, "ethylene/α-olefin copolymer" as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "propylene/α-olefin interpolymer," as used herein, refers to an interpolymer that comprises a majority amount of polymerized propylene monomer (based on the weight of the interpolymer) and at least one α-olefin, wherein the α-olefin includes ethylene.

The term, "propylene/α-olefin copolymer," as used herein, refers to a copolymer that comprises a majority amount of polymerized propylene monomer (based on the weight of the copolymer), and an α-olefin, as the only two monomer types, wherein the α-olefin includes ethylene.

The term "composition," as used herein, includes a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "propylene/ethylene copolymer," as used herein, is a copolymer containing, in polymerized form, (1) a majority weight percent propylene monomer and (ii) ethylene monomer. A "random propylene/ethylene copolymer" is a polymer having individual repeating units of the ethylene monomer present in a random or statistical distribution in the polymer chain.

The composition according to the present invention comprises (a) propylene/ethylene interpolymer having a density from 0.860 to 0.870 g/cc; (b) a propylene-based polymer selected from the group consisting of a homopolymer polypropylene, a random propylene/α-olefin, and any combination thereof and wherein the propylene-based polymer has a density greater than or equal to 0.885 g/cc; (c) a plasticizing agent; and (d) a third polymer selected from the group consisting of (i) a styrenic ethylene/butyl=triblock copolymer having a Tg (rubber block) greater than, or equal, −40° C., (ii) less than, or equal to, 15 wt?% based on the weight of the composition, of an ethylene/α-olefin/diene interpolymer, an ethylene/propylene copolymer or a combination thereof (iii) an ethylene vinyl acetate copolymer, and (iv) any combination thereof.

In a particular embodiment, the composition comprises from 25 to 80 wt % component (a); from 2 to 25 wt % component (b), from 5 to 40 wt % component (c), and from 1 to 20 wt % component (d), all based on the total weight of the composition. All individual values and subranges of amount of the propylene/α-olefin interpolymer (component (a)) from 25 to 80 wt % are included and disclosed herein; for example, the amount of component (a) can range from a lower limit of 25, 35, 45, 55, 65, or 75 wt % to an upper limit of 30, 40, 50, 60, 70 or 80 wt %. For example, the amount of component (a) can be from 25 to 80 wt %, or in the alternative, from 25 to 45 wt %, or in the alternative, from 55 to 80 wt %, or in the alternative, from 35 to 60 wt %, or in the alternative, from 30 to 70 wt %.

All individual values and subranges of amount of the second polymer (component (b)) from 2 to 25 wt % are included and disclosed herein; for example, the amount of component (b) can range from a lower limit of 2, 12, 17, 22 or 24 wt % to an upper limit of 4, 14, 18, 23 or 25 wt %. For example, the amount of component (b) can be from 2 to 25 wt %, or in the alternative, from 2 to 15 wt %, or in the alternative, from 15 to 25 wt %, or in the alternative, from 8 to 20 wt %, or in the alternative, from 12 to 22 wt %. a second polymer All individual values and subranges of amount of the plasticizing agent (component (c)) from 5 to 40 wt % are included and disclosed herein; for example, the amount of component (c) can range from a lower limit of from 5, 15, 25, or 35 wt % to an upper limit of 7, 17, 27, 37 or 40 wt %. For example, the amount of component (c) can be from 5 to 40 wt %, or in the alternative, from 5 to 25 wt %, or in the alternative, from 25 to 40 wt %, or in the alternative, from 15 to 30 wt %, or in the alternative, from 17 to 35 wt %.

All individual values and subranges of amount of the third polymer (component (d)) from 1 to 20 wt % are included and disclosed herein; for example, the amount of component (d) can range from a lower limit of from 1, 4, 7, 10, 13, 16 or 19 wt % to an upper limit of 2, 5, 8, 11, 14, 17 or 20 wt %. For example, the amount of component (d) can be from 1 to 20 wt %, or in the alternative, from 12 to 20 wt %, or in the alternative, from 1 to 13 wt %, or in the alternative, from 6 to 18 wt %, or in the alternative, from 9 to 15 wt %.

In one embodiment, the invention provides the composition according to any embodiment disclosed herein, except that the composition exhibits a Shore A hardness less than. or equal to 60. All individual values and subranges less than or equal to 60 are included and disclosed herein. For example. the Shore A hardness of the composition can be less than or equal to 60, or in the alternative, less than or equal to 55, or in the alternative, less than or equal to 50, or in the alternative, less than or equal to 45, or in the alternative, less than or equal to 35.

In another embodiment, the invention provides the composition according to any embodiment disclosed herein, except that the composition exhibits a total haze, as measured on 3.2 mm thick injection molded plaques, of less than 30 percent. All individual values and subranges from less than 30 percent are included and disclosed herein. For example, the total haze of the composition can be less than 30 percent, or in the alternative, less than 29 percent, or in the alternative, less than 28 percent, or in the alternative, less than 27 percent, or in the alternative, less than 26 percent.

In yet another embodiment, the invention provides the composition according to any embodiment disclosed herein, except that the composition exhibits a crystallization temperature (Tc) from 75 to 95° C. All individual values and subranges from 75 to 95° C. are included and disclosed herein; for example, the Tc can be from a lower limit of 75, 80, 85, or 90° C. to an upper limit of 77, 82, 87, 92, or 95° C. For example, the Tc of the composition can be from 75 to 95° C., or in the alternative, from 75 to 90° C., or in the alternative, from 80 to 95° C., or in the alternative, from 80 to 90° C.

In yet another embodiment, the invention provides the composition according to any embodiment disclosed herein, except that the composition exhibits a ΔHm from 20 to 35 J/g. All individual values and subranges from 20 to 35 J/g are included and disclosed herein; for example, the ΔHm can be from a lower limit of 20, 22, 24, 26, 28, 30, 32, or 34 J/g to an upper limit of 21, 23, 25, 27, 29, 31, 33 or 35 J/g. For example, the ΔHm can be from 20 to 35 J/g, or in the alternative, from 20 to 29 J/g, or in the alternative, from 29 to 35 J/g, or in the alternative, from 22 to 30 J/g, or in the alternative, from 23 to 33 J/g.

In yet another embodiment, the invention provides the composition according to any embodiment disclosed herein, except that the composition exhibits a melt flow rate ("MFR") (measured at 190° C., 2.16 kg) of greater than 20 g/10 min. All individual values and subranges of greater than 20 al/10 min are included and disclosed herein. For example, the MFR can be greater than 40 g/10 min, or in the alternative, greater than 60 g/10 min, or in the alternative, greater than 80 g/10 min, or in the alternative, greater than 100 g/10 min, or in the alternative, greater than 120 g/10 min.

In yet another embodiment, the invention provides the composition according to any embodiment disclosed herein, except that the total content of components (a), (b) and (c) is greater than or equal to 90 wt %, based on the total weigh of the composition. All individual values and subranges of greater than or equal to 90 wt % are included and disclosed herein. For example, the total content of components (a), (b) and (c) can be greater than 90, 92, 94 or 95 wt %.

In yet another embodiment, the invention provides the composition according to any embodiment disclosed herein, except that the composition further comprises fumed silica and/or precipitated silica.

In yet another embodiment, the invention provides the composition according to any embodiment disclosed herein, except that the composition further comprises a mold release agent. In a particular embodiment, the mold release agent comprises an oleamide.

Propylene/α-olefin Interpolymer (Component (a))

As used in the term "propylene/α-olefin interpolymer," α-olefin includes ethylene as well as higher carbon number α-olefins, such as 1-butene, 1-hexene and 1-octene.

The composition suitable for injection molded article according to the present invention comprises from 50 to 80 percent by weight of a propylene/α-olefin interpolymer composition (PBE), for example from 55 to 65 weight percent. The propylene/α-olefin interpolymer composition comprises a propylene/alpha-olefin copolymer, and may optionally further comprise one or more polymers, e.g. a random copolymer polypropylene (RCP). In one particular embodiment, the propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra, The propylene/alpha-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/alpha-olefin copolymer may have a melt flow rate in the range of from 0.1 to 20 g/10 minutes; or from 0.1 to 18 g/10 minutes; or from 0.1 to 1.5 g/10 minutes; or from 0.1 to 12 g/10 minutes; or from 0.1 to 10 g/10 minutes; or from 0.1 to 5 g/10 minutes; or from 0.1 to 2 g/10 minutes.

The propylene/alpha-olefin copolymer has a crystallinity in the range of from at least 1 percent by weight (a heat of fusion of at least 2 joules/gram) to 20 percent by weight (a heat of fusion of less than 33 Joules/gram). All individual values and subranges from 1 percent by weight (a heat of fusion of at least 2 Joules/gram) to 20 percent by weight (a heat of fusion of less than 33 Joules/gram) are included herein and disclosed herein; for example, the crystallinity can be from a lower limit of 1 percent by weight (a heat of fusion of at least 2 joules/gram), 2.5 percent (a heat of fusion of at least 4 Joules/gram), or 3 percent (a heat of fusion of at least 5 Joules/gram) to an upper limit of 20 percent by weight (a heat of fusion of less than 33 Joules/gram), 16 percent by weight (a heat of fusion of less than 26 Joules/gram), 12 percent by weight (a heat of fusion of less than 20 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 20 percent by weight (a heat of fusion of less than 33 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fission of at least 2 Joules/gram) to 5 percent by weight (a heat of fusion of less than 8.3 Joules/gram). The crystallinity is measured via Differential scanning calorimetry (DSC) method.

The propylene/alpha-olefin copolymer has a DSC melting point (second heat) of less than 80° C., for example, from 25 to 75° C., or in the alternative, between 40 and 70° C.

The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

In one embodiment, the propylene/alpha-olefin copolymer comprises from 9 to 40 percent by weight of units derived from one or more alpha-olefin comonomers. All individual values and subranges from 9 to 40 weight percent are included herein and disclosed herein; for example, the weight percent of units derived from one or more alpha-olefin comonomers can be from a lower limit of 9, 10, 11, 12 or 13 weight percent to an upper limit of 40, 35, 30, 27, 20, or 15 weight percent. For example, the propylene/alpha-olefin copolymer comprises from 9 to 35 percent by weight of units derived from one or more alpha-olefin comonomers; or in the alternative, the propylene/alpha-olefin copolymer comprises from 10 to 25 percent by weight of units derived from one or more alpha-olefin comonomers; or in the alternative, the propylene/alpha-olefin copolymer comprises from 10 to 20 percent by weight of units derived from one or more alpha-olefin comonomers; or in the alternative, the propylene/alpha-olefin copolymer comprises from 10 to 15 percent by weight of units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 91, preferably between 80 and 90 and more preferably between 85 and 90, weight percent units derived from propylene, and (B) between 9 and 40, preferably between 10 and 20, and more preferably between 10 and 15, weight percent units derived from at least one of ethylene and/or a $C_{4-10}$ α-olefin; and containing an average of at least 0.001, preferably an average of at least 0.005 and more preferably an average of at least 0.01, long chain branches/ 1000 total carbons. The maximum number of long chain branches in the propylene/alpha-olefin copolymer is not critical, but typically it does not exceed 3 long chain branches/1000 total carbons. The term long Chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and international Patent Application No. PCT US08/082599, each of which is incorporated herein by reference.

In a particular embodiment, the invention provides a composition in accordance with any embodiment disclosed herein, except that component (a) exhibits one or more of the following properties: a density from 0.86 to 0.87 g/cc, a crystallinity from 2 to 12 wt %, a ΔHm from 0 to 22 J/g, Tm less than 80° C. α-olefin comonomer content greater than 9 wt %), and a melt flow rate from 0.5 to 30 g/10 min.

All individual values and subranges of a component (a) density from 0.86 to 0.87 g/cc are included and disclosed herein; for example, the density of component (a) can be from a lower limit of 0.86, 0.862, 0.864, 0.866, or 0.868 g/cc to an upper limit of 0.861, 0.863, 0.865, 0.867, 0.869 or 0.87 g/cc. For example, the component (a) density can be from 0.86 to 0.87 g/cc, or in the alternative, from 0.860 to 0.868 g/cc, or in the alternative, from 0.863 to 0.867 g/cc, or in the alternative, from 0.865 to 0.87 g/cc.

All individual values and subranges of a component (a) crystallinity front 2 to 12 percent by weight (wt %) are included herein and disclosed herein; for example, the crystallinity can range from a lower limit of 2, 4, 6, 8 or 10 percent by weight to an upper limit of 3, 5, 7, 9, 11 or 12 percent by weight. For example, the crystallinity of component (a) may be from 2 to 12 percent by weight, or in the alternative, from 2 to 7 percent by weight, or in the alternative, from 6 to 12 percent by weight, or in the alternative, from 4 to 10 percent by weight, or in the alternative, from 3 to 11 percent by weight.

All individual values and subranges of the heat of fusion (ΔHm) from 0 to 22 Joules per gram (J/g) are included herein and disclosed herein; for example, the ΔHm can range from a lower limit of 0, 4, 8, 12, 16, or 20 J/g to an upper limit of 2, 6, 10, 14, 18 or 22 J/g. For example, the ΔHm may be from 0 to 22 J/g, or in the alternative, from 0 to 11 J/g, or in the alternative, from 11 to 22 J/g, or in the alternative, from 5 to 17 J/g, or in the alternative, from 8 to 19 J/g.

All individual values and subranges of a DSC melting point (Tm) of less than 80° C. are included herein and disclosed herein. For example, the Tm may less than 80° C., or in the alternative, less than 70° C., or in the alternative, less than 60° C., or in the alternative, less than 50° C., or in the alternative, less than 40 or in the alternative, less than 30° C.

All individual values and subranges of a melt flow rate (MFR) from 0.5 to 30 g/10 min are included herein and disclosed herein; for example, the MFR can be from a lower limit of 0.5, 5, 10, 15, 20 or 25 g/10 min to an upper limit of 1, 8, 13, 17, 23, 27 or 30 g/10 min. For example, component (a) can have a MFR in the range of from 0.5 to 30 g/10 min; or in the alternative, from 0.5 to 15 g/10 min; or in the alternative, from 15 to 0 g/10 min; or in the alternative, from 12 to 22 g/10 min, or in the alternative, from 15 to 20 g/10 min.

In a specific embodiment, the propylene/α-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

In one embodiment, the propylene/α-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/α-olefin copolymer is not critical, but typically it does not exceed 3 long chain branches/1000 total carbons. The term long chain branch, as used herein with regard to propylene/α-olefin copolymers, refers to a chain length of at least one (1) carbon more than a short chain branch, and short chain branch, as used herein with regard to propylene/α-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/α-olefin copolymers are further described in details in the U.S. Provisional Patent Application No. 60/988,999 and International Patent Application No. PCT/US08/082599, each of which is incorporated herein by reference.

The propylene α-olefin interpolymer may, in some embodiments, further comprise one or more additives. Such additives include, but are not limited to, antistatic agents, color enhancers, dyes, lubricants, fillers, pigments, primary antioxidants, secondary antioxidants, processing aids, UV stabilizers, and combinations thereof. The propyleneα-olefin interpolymer composition may contain any amounts of additives. The propylene/α-olefin composition may compromise from about 0 to about 20 percent by the combined weight of such additives, based on the weight of the propylene/α-olefin interpolymer composition and the one or more additives.

The Second Polymer (Component (b))

The composition comprises a second polymer selected from the group consisting of homopolymer polypropylene (hPP), random copolymer polypropylenes (RCPP), and any combination thereof.

In a particular embodiment, component (b) exhibits one or more of the following properties: tensile strength at yield from 4 to 10 MPa; and elongation at yield from 5 to 15.

All individual values and subranges of tensile strength at yield from 4 to 10 MPa are included and disclosed herein; for example, the tensile strength can be from a lower limit of 4, 6 or 8 MPa to an upper limit of 5, 7, 9 or 1 MPa. For example, the tensile strength of component (b) can be from 4 to 10 MPa, or in the alternative, from 4 to 6 MPa, or in the alternative, from 6 to 10 MPa, or in the alternative, from 5 to 7 MPa.

All individual values and subranges of elongation at yield from 5 to 15% are included and disclosed herein; for example, the elongation can be from a lower limit of 5, 7, 9, 11, or 13% to an upper limit of 6, 8, 10, 13, 14 or 15%, For example, the elongation at yield of can be from 5 to 15%, or in the alternative, from 5 to 10%, or in the alternative, from 10 to 15%, or in the alternative, from 7 to 12%, or in the alternative, from 6 to 14%.

All individual values and subranges of flexural modulus from 900 to 1500 MPa are included and disclosed herein; for example, the flexural modulus can be from a lower limit of 900, 1100 or 1300 MPa to an upper limit of 1000, 1200, 1400 or 1500 MPa. For example, the flexural modulus can be from 900 to 1500 M Pa, or in the alternative, from 900 to 1200 MPa, or in the alternative, from 1200 to 1500 MPa, or in the alternative, from 1100 to 1400 MPa, or in the alternative, from 1000 to 1300 MPa.

All individual values and subranges of notched izod impact strength from 20 to 65 J/m are included and disclosed herein; for example, the notched izod impact strength can be from a lower limit of 20, 30, 40 50 or 60 J/m to an upper limit of 25, 35, 45, 55 or 65 J/m. For, example, the notched izod impact strength can be from 20 to 65 J/g, or in the alternative, from 20 to 45 J/g, or in the alternative, from 44 to 65 J/g, or in the alternative, from 30 to 55 J/g, or in the alternative, from 35 to 60 J/g.

Homopolymer Polypropylene

Any homopolymer polypropylene may be used in embodiments of the composition, including crystalline and non-crystalline homopolymer polypropylene. U.S. Pat. No. 5,483,002 and EP 643100, the disclosures of both of which are incorporated herein by reference, teach semi-crystalline homopolymer polypropylene having a melting point of 125 to 165° C., semi-crystalline homopolymer polypropylene having a melting point below 130° C., non-crystallizing homopolymer polypropylene having a glass transition temperature which is less than or equal to −10° C., and blends thereof, any of which may be used in various embodiments of the composition.

Exemplary hPP useful in the present invention include various grades of PROFAX, commercially available from LyondellBasell, Inc.

Random Copolymer Polypropylenes

The random copolymer polypropylene comprises propylene polymerized with one or more other monomers addition polymerizable with propylene. The other monomers are preferably olefins, more preferably α-olefins (including ethylene), most preferably ethylene or an olefin having a structure $RCH=CH_2$ where R is aliphatic or aromatic and has at least two and preferably less than 18 carbon atoms. Hydrocarbon olefin monomers within the skill in the art, include hydrocarbons having one or more double bonds at least one of which is polymerizable with the α-olefin monomer.

Suitable α-olefins for polymerizing with propylene include 1-butene, 1-pentene, 1-hexene, 1-octene, 1-nonene, 1-decene, 1-unidecene, 1-dodecene and the like as well as 4-methyl-1-pentene, 4-methyl-1-hexene, 5-methyl-1-hexene, vinylcyclohexane, styrene and the like. The preferred α-olefins include ethylene, 1-butene, 1-hexene, and 1-octene.

Optionally, the RCPP comprises monomers having at least two double bonds which are preferably dienes or trienes. Suitable diene and triene comonomers include 7-methyl.-1,6-octadiene, 3,7-dimethyl-1,6-octadiene 5,7-dimethyl-1,6-octadiene, 3,7,11-trimethyl-1,6,10-octatriene, 6-methyl-1,5-heptadiene 1,3-butadiene, 1,6-heptadiene, 1,7-octadiene, 1,8-nonadiene, 1,9-decadiene, 1,10-undecadiene, norbornene, tetracyclododecene, or mixtures thereof, preferably butadiene, hexadienes, and oetadienes, most preferably 1,4-hexadiene, 1,9-decadiene, 4-methyl-1,4-hexadiene, 5-methyl-1,4-hexadiene, dicyclopentactiene, and 5-ethylidene-2-norbornene.

The Third Polymer (Component (d))

The composition comprises a third polymer selected from the group consisting of (i) a styrenic ethylene/butylene triblock copolymer having a Tg (rubber block) greater than, or equal, −50° C., (ii) less than, or equal to, 15 wt %, based on the weight of the composition, of the following: an ethylene/α-olefin/diene interpolymer, an ethylene/propylene copolymer that has a density from 0.850 to 0.870 g/cc, or a combination thereof; (iii) an ethylene vinyl acetate copolymer, and (iv) any combination thereof.

In one embodiment, the third polymer is one or more styrenic ethylene/butylene triblock copolymers having a butylene content such that a Tg of a rubber block is equal to or greater than −50° C. All individual values and subranges of a Tg from greater than −50° C. are included and disclosed herein. For example, the Tg of the rubber block of the copolymer can be greater than −50° C., or in the alternative, greater than −49° C., or in the alternative, greater than −48° C., or in the alternative, greater than −47° C., or in the alternative, greater than −46° C., or in the alternative, greater than −45° C.

In one embodiment, the one or more styrenic ethylene/butylene triblock copolymers may have an MFR (measured at 230° C., 2.16 kg) from 2 to 25 g/10 min. All individual values and subranges of the MFR of the copolymer from 2 to 25 g/10 min are included and disclosed herein; for example, the MFR can range from a lower limit of 2, 7, 12, 17, 22, or 24 g/10 min to an upper limit of 4, 9, 14, 19, 24 or 25 g/10 min. For example, the MFR of the copolymer can be from 2 to 25 g/10 min, or in the alternative, from 2 to 14 g/10 min, or in the alternative, from 13 to 25 g/10 min, or in the alternative, from 7 to 20 g/10 min, or in the alternative, from 5 to 15 g/10 min.

Styrenic/ethylene/butylene triblock copolymers (SEBs) are known in the art.

In another embodiment, the third polymer is less than, or equal to, 15 wt %, based on the weight of the composition, of the following: an ethylene/α-olefin/diene interpolymer, an ethylene/propylene copolymer that has a density from 0.850 to 0.870 g/cc, or a combination thereof. An ethylene/propylene copolymer is a copolymer having a majority wt % units derived fromethylene with the remainder units derived from propylene. In a particular embodiment, the ethylene/propylene copolymer has a Mooney Viscosity from 15 to 80. All individual values and subranges from 15 to 80 are included and disclosed herein. For example, the Mooney Viscosity can range from a lower limit of 15, 30, 45, 60 or 75 to an upper limit of 20, 35, 50, 65, or 80.

In another embodiment, the third polymer is one or more ethylene/α-olefin/diene interpolymers having a density from greater than 0.85 to less than or equal to 0.88 g/cc. All individual values and subranges of interpolymer density from greater than 0.85 to less than or equal to 0.8 g/cc are included and disclosed herein; for example, the density can range from a lower limit of 0.85, 0.857, 0.864, 0.871, or 0.878 g/cc to an upper limit of 0.855, 0.860, 0.869, 0.875 or 0.88 g/cc. For example, the density of the interpolymer can be from 0.85 to 0.88 g/cc, or in the alternative, from 0.85 to 0.864 g/cc, or in the alternative, from 0.859 to 0.88 g/cc, or in the alternative, from 0.86 to 0.87 g/cc, or in the alternative, from 0.8555 to 0.875 g/cc.

Exemplary dimes for use in the ethylene/α-olefin/diene interpolymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene.

α-olefins for use in the ethylene/α-olefin/diene interpolymers may be selected, in certain embodiments, from the group of $C_3$-$C_{20}$ α-olefins. Preferred α-olefins for use in certain embodiments of the invention are designated by the formula $CH_2CHR*$, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. In one embodiment, the α-olefin is propylene.

In a particular embodiment, component (d) is an ethylene/α-olefin/diene interpolymer which exhibits one or more of the following properties: ethylene content from 60 to 80 wt %, a propylene content from 20 to 30 wt %, and a Mooney Viscosity (ML 1+4, 121° C.) from 60 to 80. All individual values and subranges of ethylene content from 60 to 80 wt %, based on the total weight of the ethylene/α-olefin/diene interpolymer are included and disclosed herein; for example, the ethylene content can be from a lower limit of 60, 64, 68, 72, or 76 wt % to an upper limit of 62, 66, 70, 74, 78 or 80 wt %. For example, the ethylene content can be from 60 to 80 wt %, or in the alternative, from 70 to 80 wt %, or in the alternative, from 60 to 70 wt %, or in the alternative, from 65 to 75 wt %. All individual values and subranges of a Mooney Viscosity (ML 1+4, 121° C.) from 60 to 80 are included and disclosed herein; for example, the Mooney Viscosity (ML 1+4, 121° C.) can be from a lower limit of 60, 64, 68, 72 or 76 to an upper limit of 62, 66, 70, 74, 78 or 80. For example, the Mooney Viscosity can be from 60 to 80, or in the alternative, from 70 to 80, or in the alternative, from 60 to 70, or in the alternative, from 66 to 75.

In one embodiment, the composition is according to any of the embodiments disclosed herein, except that component (d), the third polymer, does not include ethylene vinyl acetate.

In one embodiment, the composition is according to any of the embodiments disclosed herein, except that component (d), the third polymer, does not include ethylene vinyl acetate or EPDM.

Plasticizing Agent (Component (c))

The composition comprises a plasticizing agent. As used herein, the term "plasticizing agent" means an additive used to modify the rheological properties to a desired consistency. Suitable plasticizers are well known in the art and include for example, such as esters of dibasic acids (or their anhydrides) with monohydric alcohols such as o-phthalates, adipates and benzoates. In a particular embodiment, the blend composition suitable for injection molded articles according to the present invention comprises from 5 to 35 percent by weight of one or more plasticizing agent, for example from 10 to 30 weight percent, or in the alternative from 20 to 30 weight percent.

The plasticizing agent can be in oil. The oil can be an aromatic oil, a mineral oil, a naphthenic oil, a paraffinic oil, a triglyceride-based vegetable oil such as castor oil, a synthetic hydrocarbon oil such as polypropylene oil, a silicone oil, or any combination thereof.

White mineral oils are preferred. The oil is a hydrocarbon oil, often referred to as a White mineral oil, or alternatively as a polymer or a processing oil. These oils are chemically defined as hydrotreated heavy paraffinic distillates or a white mineral oil. The oils of most utility have little to no aromatic content, from 50 to 90% paraffinic content, and from 10 to 50% naphthenic content, and most preferably from 65 to 75% paraffinic content and from 25 to 35% naphthenic content. Such plasticizing agent can have a viscosity in the range of from 12 to 70, for example from 15 to 55, cSt at 40° C. measured according to ASTM D-445.

Suitable plasticizing agents include, but are not limited to, mineral oils such as hydrocarbon mineral oils, e.g. PARALUX 6001R, available from ChevronTexaco; HYDROBRITE 550, available from Sonneborn, Inc. LP 200, available from Sonneborn; INDOPOL H-15, available from INEOS, RISELLA X 420, available from Shell Deutschland Oil GmbH, PLASTHALL 100, available from The HallStar Company.

The mineral oil can be a white mineral oil having a refractive index in the range of from 1.45 to 1.49, measured according to ASTM-D 1218, having a paraffinic carbon content in the range of 50 to 90 percent, measured according to ASTM-D 3238, having a naphthenic carbon content in the range of 10 to 50 percent, measured according to ASTM-D 3238, and/or a kinematic viscosity at 40° C. in the range of from 15 to 400 cSt, measured according to ASTM-D 445.

In a particular embodiment, the plasticizing agent is one or more hydrocarbon mineral oils. In yet another embodiment, the hydrocarbon mineral oil exhibits one or more of the following properties: viscosity at 40° C. from 15 to 400 cSt and specific gravity from 0.85 to 0.89. All individual values and subranges of viscosity at 40° C. from 15 to 400 cSt are included and disclosed herein; for example, the viscosity can be from a lower limit of 15, 50, 125, 200, 275, or 325 to an upper limit of 20, 100, 175, 250, 350 or 400 cSt. For example, the viscosity can be from 15 to 400 cSt, or in the alternative, from 15 to 200 cSt, or in the alternative, from 200 to 400 cSt or in the alternative, from 150 to 350 cSt, or in the alternative, from 55 to 250 cSt. All individual values and subranges of specific gravity from 0.85 to 0.89 are included and disclosed herein; for example, the specific gravity can be from a lower limit of 0.85, 0.86, 0.87 or 0.88 to an upper limit of, 0.86, 0.87, 0.88, or 0.89. For example, the specific gravity can be from 0.85 to 0.89, or in the alternative, from 0.85 to 0.87, or in the alternative, from 0.87 to 0.89, or in the alternative, from 0.86 to 0.88.

Additional Embodiments

In a particular embodiment, the invention further provides the composition according to any embodiment disclosed herein except that the Refractive Index (RI) of component d is within +/−1.2% of the Refractive Index of component a. All individual values and subranges from +/−1.2% are included and disclosed herein. For example, the Refractive Index (RI) of component d may be within +/−1.2%, or in the alternative, within ±/−1.0%; or in the alternative, within +/−0.8% of the Refractive Index of component a.

In a particular embodiment, the invention further provides the composition according to any embodiment disclosed herein except that the Refractive Index (RI) of component b is within +/−5% of the Refractive Index of component a. All individual values and subranges from +/−5% are included and disclosed herein. For example, the Refractive Index (RI) of component b may be within +/−5%, or in the alternative, within +/−2%; or in the alternative, within +/−2% of the Refractive Index of component a.

In one embodiment, the invention further provides the composition according to any embodiment disclosed herein except that component d is an ethylene/propylene/diene interpolymer, In one embodiment, the invention further provides the composition according to any embodiment disclosed herein except that component d is an ethylene/propylene copolymer.

In one embodiment, the invention further provides the composition according to any embodiment disclosed herein except that component d is a combination of an ethylene/propylene/diene interpolymer and an ethylene/propylene copolymer.

The invention further provides an injection molded article comprising the composition according to any embodiment disclosed herein. In a particular embodiment, the injection molded article is footwear or a component of footwear.

The invention farther provides a process for making an injection molded article comprising (a) selecting from 20 to 80 wt % of a propylene/α-olefin interpolymer composition; (b) selecting from 2 to 25 wt % of a second polymer selected from the group consisting of homopolymer polypropylene, a random copolymer polypropylene, clarified random copolymer polypropylene, and combinations thereof; and (c) selecting from 5 to 40 wt % of a plasticizing agent; (d) a third polymer selected from the group consisting of (i)

styrenic ethylene/butylene triblock copolymers having a butylene content such that a Tg of a rubber block is greater than −40° C. and having an MFR (measured at 230° C., 2.16 kg) from 2 to 25 g/10 min, (ii) ethylene/α-olefin/diene interpolymers having a density from greater than 0.85 to less than or equal to 0.88 g/cc, and any combination thereof; (e) contacting said a-d components in the presence of heat; (f) thereby forming a composition, wherein said blend composition has a total haze of less than 25 percent; and (g) forming said composition into a molded article.

In a particular embodiment, the invention provides the process for making an injection molded article further comprising selecting a mold release agent, and contacting said a-d components and said mold release agent in the presence of heat; thereby forming a composition, wherein said composition has a total haze of less than 25 percent; and forming said blend composition into a molded article.

EXAMPLES

The following examples illustrate the present invention but are not intended to limit the scope of the invention. The following materials were used in preparing the Inventive and Comparative Examples.

PE Copolymer 1 (DE 2400.05, which is commercially available from The Dow Chemical Company) is a propylene/ethylene copolymer having a melt flow rate (at 230° C., 2.16 kg) of 2 g/10 minutes and a density of 0.863 g/cc.

KRATON G1652 SEBS, commercially available from Kraton Polymers US LLC (Houston, Tex., US), is a linear triblock copolymer based on styrene and ethylene/butylene with a polystyrene content from 29.0 to 30.8 wt % (based on the weight of the polymer) having a melt flow rate (at 230° C., 5.0 kg) of 5 g/10 minutes (target), and Tg (rubber block)=−54.6° C.

KRATON G1645 SEBS, commercially available from Kraton Polymers US LLC (Houston, Tex., USA), is a linear triblock copolymer based on styrene and ethylene/butylenes with a polystyrene content from 11.5 to 13.5% having a melt flow rate (at 230° C., 2.16 kg) from 2 to 4.5 g/10 minutes, Tg of rubber block of −45.70° C.

BRASKEM PP R7021-50RNA, commercially available from Braskem Corp. (Philadelphia, Pa., USA), is a random clarified copolymer polypropylene having a target melt flow rate (at 230° C., 2.16 kg) of 50 g/10 minutes.

AM Fine AX-71 is an alkyl phosphate-based release agent having an average molecular weight of 490, and a melting point temperature in the range of from 70 to 75° C., which is commercially available from Amfine Chemical Corporation (Hopkinsville, Ky., USA).

CRODAMIDE VRX is a primary amide C18 unsaturated derived from a vegetable source that rapidly blooms to the surface to impart slip characteristics, Crodamide VRX melts in the 72-77° C. and it is commercially available from Croda Inc. (Edison, N.J., USA).

HYDROBRITE LP200, which is commercially available from Sonneborn LLC (Parsippany, N.J., USA) is a white and highly refined mineral oil of 20.5 cSt at 40° C. and a density of 0.81-0.89 g/cm3.

NORDEL 4770, commercially available from The Dow Chemical Company (Midland, Mich., USA) is an ethylene propylene diene terpolymer with a Mooney viscosity (ML 1+4 at 125° C.) of 70, a 70% of ethylene content, a 4.9% of ENB, and a target Tc of 34° C.

EL VAX 260, commercially available from EA DuPont deNemours Company (Wilmington, Del., USA) is an ethylene-vinyl acetate copolymer resin with 28 by weight of vinyl acetate comonomer content and a melt flow rate of 6 g/10 min (190° C./2.16 kg.

AXEL INT-33RTE is an Internal Mold Releases/Process Aid Additives which is commercially available from Axel Plastics Research Laboratories, Inc. (Woodside, N.J., USA).

Inventive and Comparative Example Compositions and selected properties thereof are shown in Table 1.

TABLE 1

| | Example | | | | | | |
|---|---|---|---|---|---|---|---|
| | Comp. Ex. 1 | Comp. Ex. 2 | Inv. Ex. 1 | Comp. Ex. 3 | Inv. Ex. 2 | Inv. Ex. 3 | Comp. Ex. 4 |
| Formulation Component (wt %) | | | | | | | |
| PE copolymer 1 | 59.95 | 48.58 | 34.062 | 34.062 | 34.062 | 40 | 30 |
| KRATON G1645 | | | 15 | | | | |
| NORDEL 4570IP | | | | | | 10 | 20 |
| BRASKEM PP R7021-50RNA (rcPP) | 10 | 11.37 | 10.913 | 10.913 | 10.913 | 10 | 10 |
| HYDROBRITE LP200 oil | 30 | 40 | 40 | 40 | 40 | 40 | 40 |
| CRODAMIDE VRX slip aid | 0.05 | 0.05 | | | | 0.05 | 0.05 |
| KRATON 1652 SEBS | | | | 15 | | | |
| ELVAX 260 | | | | | 15 | | |
| AXEL INT-33RTE | | | 0.025 | 0.025 | 0.025 | | |
| Properties of Compounds | | | | | | | |
| Density, g/cc | 0.88 | 0.88 | 0.88 | 0.89 | 0.89 | 0.88 | 0.88 |
| Sh. A Hardness, 10 sec | 60 | 52 | 47 | 53 | 54 | 53 | 52 |
| Haze, % | 27 | 28 | 17 | 72 | 28 | 25 | 38 |
| Haze, % after aging | 24 | 24 | 27 | 76 | 29 | 29 | 40 |
| Fingerprint | 1 | 3 | 1 | 1 | 1 | 1 | 1 |
| $T_c$ by DSC, ° C. | 83 | 86 | 89 | 85 | 94 | 83 | 84 |
| $\Delta H_m$ by DSC, J/g | 27.0 | 22.9 | 14.0 | 12.7 | 18.3 | 16.1 | 16.6 |
| TMA, ~1000 micron, ° C. | 98.2 | 89.4 | 89.1 | 93.6 | 85.7 | 125 | 124.9 |
| $I_2$ at 230° C., g/10 min | 27 | 78 | 148 | 139 | 136 | 20 | 14 |
| Tensile Strength, MPa | 5.2 | 4.7 | 4.8 | 6.0 | 6.4 | 5.2 | 5.0 |
| Elongation at Break, % | 468 | 564 | 809 | 879 | 980 | 710 | 766 |
| Die C Tear Strength, lb/in | 214 | 176 | 135 | 153 | 175 | 167 | 148 |

The formulations described in Table 1 were prepared according to the following process. Formulation components reported in Table 1 were inch-blended via a twin-screw extruder, ZSK 30 mm extruder equipped with a water bath, and strand cutter or under-water pelletization thereby producing polymer pellets. Extrusion conditions shown in Table 2.

TABLE 2

| | |
|---|---|
| Zone 1 Temp (° C.) | 110 |
| Zone 2 Temp (° C.) | 140 |
| Zone 3 Temp (° C.) | 140 |
| Zone 4 Temp (° C.) | 140 |
| Zone 5 Temp (° C.) | 140 |
| Zone 6 Temp (° C.) | 150 |
| Screw Speed (rpm) | 225 |
| Water Bath Temp (° C.) | ~5 |
| Total Feed Rate (lbs/hr) | 25 |

The formulated compositions (pellets) were injection molded into plaques 4 inch×6 inch×0.125 inch) on a Krauss Maffei KM 110-390/390 CL Injection Molding Machine, equipped with a single shot mold base using conditions listed in Table 3.

TABLE 3

| | |
|---|---|
| Hopper Zone Temp (° C.) | 40 |
| Zone 1 Temperature (° C.) | 121 |
| Zone 2 Temperature (° C.) | 175 |
| Zone 3 Temperature (° C.) | 204 |
| Zone 4 Temperature (° C.) | 204 |
| Zone 5 Temperature (° C.) | 204 |
| Nozzle Temperature (° C.) | 200 |
| Mold Temperature (° C.) | 18 |
| Extruder Speed (rpm) | 150 |
| Extruder Backpressure (bar) | 15 |
| Dosage (ccm) | 75 |
| Injection Speed (ccm/s) | 40 |
| Injection Pressure (bar) | 2000 |
| Switch Over Position (ccm) | 15 |
| Hold Pressure (bar) | 250 |
| Hold Time (s) | 30 |
| Cool Time (s) | 30 |

TABLE 4

| | RI | Absolute value of $\{[(RI_d - RI_a)/RI_a] \times 100\}$ | Absolute value of $\{[(RI_b - RI_a)/RI_a] \times 100\}$ |
|---|---|---|---|
| KRATON 1645 (component d) | 1.489 | 0.67% | |
| KRATON 1652 (comparative d) | 1.503 | 1.62% | |
| DE24000.05 (component a) | 1.479 | — | — |
| BRASKEM PP R7021-50RNA (RCPP) (component b) | 1.503~1.504 | | 1.62-1.67% |
| NORDEL 4770 (component d) | 1.480 | 0.07% | |
| ELVAX 260 (component d) | 1.486 | 0.47% | |

Comparative Example (Comp. Ex.) 1 and Comparative Example 2 exemplify a composition containing VERSIFY/RCPP/Oil/Release aid blends that pass and do not pass (respectively) the heat aging test (55° C./5 days), therefore indicating that 35% is about the maximum amount of plasticizer that could be used, incorporation of a third polymer resin (Inventive Example 1 (Inv, Ex. 1)) addresses tack build up and allows reducing the hardness. Inv. Ex. 2 shows use of ELVAX decreases haze inventive Example 3 shows a formulation with 40% plasticizer that passes the heat aging test and has low haze.

Addition of "component d" aims at enhancing oil incorporation while preserving the clarity of the blend. To preserve the optical properties of the blend, the components need to be compatible and the differences in their refractive indexes has to be small. It has been discovered that such differences in the refractive index need to be lower than 1% relative to the "component a" (See Table 4). Note how in the case of KRATON 1652, the difference in refractive index does not meet this requirement therefore resulting in hazy blends. Higher refractive index of KRATON 1652 relative to KRATON1645, is attributed to its lower butylene content and higher ethylene content in the midblock as reflected by its lower Tg and some degree of crystallinity as indicated by the presence of a melting peak (7.4 C). Polypropylene (component b) is fully compatible with component a resulting in a low haze blend.

Test Methods

Density (g/cc) was measured according to ASTM-D 792-03, Method B, in isopropanol. Specimens were measured in the isopropanol bath at 23 for 8 min to achieve thermal equilibrium prior to measurement.

Shore A hardness was tested as per ASTM D2240 on a Shore A electric durometer. Weight was applied for 10 seconds.

Haze was measured on 0.125" thick injection molded plaques (see experimental section) according to ASTM D-1003.

DSC crystallization point temperature ($T_c$) is derived from DSC cooling curve.

Heat of fusion is derived from DSC melting curve.

Weight percent crystallinity is measured via Differential Scanning calorimetry (DSC).

Differential Scanning calorimetry (DSC) is based on the following. All of the results reported here were generated via a TA Instruments Model Q1000 DSC equipped with an RCS (refrigerated cooling system) cooling accessory and an auto sampler. A nitrogen purge gas flow of 50 ml/min was used throughout. The sample (5-10 grams) was pressed into a thin film using a press at 175° C. and 1500 psi (10.3 MPa) maximum pressure for about 15 seconds, then air-cooled to room temperature at atmospheric pressure. About 3 to 10 mg of material was then cut into a 6 mm diameter disk using a paper hole punch, weighed to the nearest 0.001 mg, placed in a light aluminum pan (ca 50 mg) and then crimped shut. The thermal behavior of the sample was investigated with the following temperature profile: The sample was rapidly heated to 180° C. and held isothermal for 3 minutes in order to remove any previous thermal history. The sample was then cooled to −80° C. at 10° C./min cooling, rate and was held at −80° C. for 3 minutes. The sample was then heated to 180° C. at 10° C./min heating rate. The cooling and second heating curves were recorded.

Thermomechanical Analysis (TMA) was conducted on the injection molded samples (see experimental section) using a TA Instruments 2940 Themomechanical Analyzer instrument equipped with a 0.89 mm contact diameter probe. A force of 1 N was applied to a sample approximately 0.2×0.2" cut from the 0.125" thick injection molded plaque. Testing was initiated at room temperature and the temperature increased at 5° C./min. The temperature at which the probe penetrated 1000 microns into the sample is reported.

Melt index 0) was measured at either 190 or 230° C. under a load of 2.16 kg according to ASTM D-1238-03.

The tackiness of the injection molded samples were evaluated using a qualitative fingerprint test. The appearance of fingerprints on the surface of injection molded plaques was determined by applying even, firm pressure with the thumb for 5 seconds to a plaque; plaque first heat aged at 70° C. for 7 days, and then cooled to room temperature, before thumb press. The appearance of a fingerprint was evaluated using the following scale: 1=no visible fingerprint, 2=marginally visible fingerprint, and 3=clearly visible fingerprint.

Ultimate tensile strength and elongation at break were obtained according to ASTM D638. Microtensile specimens were cut from the injection molded plaques (see experimental section).

Die C-Tear testing was performed according to ASTM D624. C-tear specimens were cut from the injection molded plaques (see experimental section).

Refractive Index (RI) was measured as follows: A Metricon prism coupler is used to measure refractive index of films with high accuracy (+ or −0.001). The measurement is performed by transmitting laser light through a film and detecting the reflected light with a photo-detector. Depending on the film the measurement time varies from 10 sec to 75 sec. Samples were prepared for RI measurement according to the following: To measure refractive index, the polymer in the form of pellets was compression molded in a Carver Press at 30000 lbf to prepare 2 in×2 in films with thicknesses up to 60 mils (1.5 mm). The Melting step was 30 seconds long at 190° C., followed by cooling at 24° C. for 30 seconds. Table 4, as shown above, provides the RI for selected components of the foregoing examples.

Mooney viscosity (ML 1+4) of the EPDM rubber was measured at 125 C in accordance with ASTM D1646-04 with one minute preheat time and a four minute rotor operation time. The instrument used was an Alpha Technologies Mooney Viscometer MV2000E The present invention may be embodied in other forms without departing from the spirit and the essential attributes thereof, and, accordingly, reference should be made to the appended claims, rather than to the foregoing specification, as indicating the scope of the invention.

We claim:

1. A composition comprising the following:
    (a) propylene/ethylene interpolymer having a density from 0.860 to 0.870 g/cc;
    (b) a propylene-based polymer selected from the group consisting of a homopolymer polypropylene, a random propylene/α-olefin interpolymer and any combination thereof, and wherein the propylene-based polymer has a density ≥0.885 g/cc;
    (c) a plasticizing agent; and
    (d) a third polymer selected from the group consisting of the following:
        (i) a styrenic ethylene/butylene triblock copolymer having a Tg (rubber block) greater than, or equal, −50° C.,
        (ii) less than, or equal to, 15 wt %, based on the weight of the composition, of the following: an ethylene/α-olefin/diene interpolymer, an ethylene/propylene copolymer that has a density from 0.850 to 0.870 g/cc, or a combination thereof;
        (iii) an ethylene vinyl acetate copolymer, and
        (iv) any combination thereof;
wherein the Refractive Index (RI) of component b is within +/−5% of the Refractive Index of component a.

2. The composition of claim 1, wherein the Refractive Index (RI) of component d is within +/−1.2% of the Refractive Index of component a.

3. The composition according to claim 1, wherein the composition comprises from 25 to 80 wt % component (a); from 2 to 25 wt % component (b), from 5 to 40 wt % component (c), and from 1 to 20 wt % component (d).

4. The composition according to claim 1, wherein component (b) is a random propylene/α-olefin interpolymer.

5. A composition comprising the following:
    (a) propylene/ethylene interpolymer having a density from 0.860 to 0.870 g/cc;
    (b) a propylene-based polymer selected from the group consisting of a homopolymer polypropylene, a random propylene/α-olefin interpolymer and any combination thereof, and wherein the propylene-based polymer has a density ≥0.885 g/cc;
    (c) a plasticizing agent; and
    (d) a third polymer that is a styrenic ethylene/butylene triblock copolymer having a Tg (rubber block) greater than, or equal, −40° C. and an MFR at 230° C., 2.16 kg from 2 to 25 g/10 min.

6. The composition according to claim 1, wherein the third polymer is less than, or equal to, 15 wt % based on the weight of the composition, of an ethylene/α-olefin/diene interpolymer having a density from greater than, or equal to, 0.85 g/cc to less than or equal to 0.87 g/cc.

7. The composition according to claim 1, wherein the composition exhibits a Shore A hardness less than 60.

8. The composition according to claim 1, wherein the composition exhibits a total haze of less than 30 percent as measured on 3.2 mm thick injection molded plaques.

9. The composition according to claim 1, wherein the composition exhibits a Tc from 75 to 95° C.

10. The composition according to claim 1, wherein the composition exhibits a ΔHm from 20 to 35 J/g.

11. The composition according to claim 1, wherein the composition exhibits a Melt Flow Rate at 230° C., 2.16 kg of greater than, or equal to, 20 g/10 min.

12. The composition according to claim 1, wherein component (a) exhibits one or more of the following properties: a density from 0.855 to 0.865 g/cc, a crystallinity from 2 to 12 wt %, a ΔHm from 0 to 22 J/g, Tm less than 80° C., α-olefin comonomer content greater than 9 wt %, and a melt flow rate from 0.5 to 30 g/10 min.

13. A composition comprising the following:
    (a) propylene/ethylene interpolymer having a density from 0.860 to 0.870 g/cc;
    (b) a propylene-based polymer selected from the group consisting of a homopolymer polypropylene, a random propylene/α-olefin interpolymer and any combination thereof, and wherein the propylene-based polymer has a density ≥0.885 g/cc;
    (c) a plasticizing agent; and
    (d) a third polymer selected from the group consisting of the following:
        (i) a styrenic ethylene/butylene triblock copolymer having a Tg (rubber block) greater than, or equal, −50° C.,
        (ii) less than, or equal to, 15 wt %, based on the weight of the composition, of the following: an ethylene/α-olefin/diene interpolymer, an ethylene/propylene copolymer that has a density from 0.850 to 0.870 g/cc, or a combination thereof;
        (iii) an ethylene vinyl acetate copolymer, and
        (iv) any combination thereof;

wherein component (b) exhibits one or more of the following properties: tensile strength at yield from 4 to 10 MPa, and elongation at yield from 5 to 15.

14. The composition according to claim 1, wherein component (d) is an ethylene/α-olefinldiene interpolymer which exhibits one or more of the following properties: ethylene content from 60 to 80 wt %, a propylene content from 20 to 30 wt %, and a Mooney Viscosity from 60 to 80.

15. The composition according to claim 1, wherein the total content of components (a), (b) and (c) is greater than or equal to 90 wt %.

16. The composition according to claim 1, wherein the plasticizing agent is one or more hydrocarbon mineral oils and wherein the hydrocarbon mineral oil exhibits one or more of the following properties: viscosity at 40° C. from 15 to 400 cSt and specific gravity from 0.85 to 0.89 g/cm3.

17. An article comprising at least one component at least partially formed from the composition according to claim 1.

18. An injection molded article comprising at least one component formed from the composition according to claim 1, wherein the article is selected from the group consisting of footwear articles, toothbrush grips, caps, closures, and overmoldings onto polypropylene containing substrates.

* * * * *